Sept. 24, 1968  B. G. COPPING ET AL  3,402,830

PALLETIZER

Filed Feb. 28, 1966  4 Sheets-Sheet 1

INVENTOR.
BRUCE G. COPPING
WALTER D. HARDEE
BY Oldham & Oldham
ATTYS.

Sept. 24, 1968    B. G. COPPING ET AL    3,402,830
PALLETIZER
Filed Feb. 28, 1966    4 Sheets-Sheet 2

INVENTOR.
BRUCE  G.  COPPING
WALTER  D.  HARDEE
BY Oldham & Oldham

ATTYS.

Sept. 24, 1968  B. G. COPPING ET AL  3,402,830
PALLETIZER

Filed Feb. 28, 1966  4 Sheets-Sheet 3

INVENTOR.
BRUCE G. COPPING
WALTER D. HARDEE
BY Oldham & Oldham
ATTYS.

Sept. 24, 1968 B. G. COPPING ET AL 3,402,830

PALLETIZER

Filed Feb. 28, 1966 4 Sheets-Sheet 4

INVENTOR.
BRUCE G. COPPING
WALTER D. HARDEE
BY Oldham & Oldham
ATTYS.

United States Patent Office 3,402,830
Patented Sept. 24, 1968

3,402,830
PALLETIZER
Bruce G. Copping and Walter D. Hardee, Akron, Ohio, assignors to Geo. J. Meyer Manufacturing Company, Milwaukee, Wis.
Filed Feb. 28, 1966, Ser. No. 530,286
11 Claims. (Cl. 214—6)

ABSTRACT OF THE DISCLOSURE

The palletizing machine has means for receiving a plurality of filled cases positioned to form a layer for a pallet, a transfer plate is provided positioned for fixed orbital movement in horizontal and vertical directions under and beyond the case positioning means while the transfer plate is retained level. The machine also includes a transfer means carried by the transfer plate to move the cases as a layer onto the transfer plate when the transfer plate is moved through its fixed orbital path, and means are provided to position a pallet under the transfer plate at one position of its movement after the cases are thereon. Stop means are provided in the apparatus adjacent the lower path of the transfer plate to engage the cases and force them off of the transfer plate onto a positioned pallet or cases thereon with continued orbital movement of the transfer plate.

---

The present invention particularly relates to apparatus for palletizing loaded cases, and especially to a machine or apparatus for arranging a plurality of packed or filled cases or similar articles into a layer, for transporting the positioned cases in the apparatus, for positioning a pallet underneath the arranged cases forming a layer, and for depositing the arranged cases as a layer onto the pallet, or onto a previous layer of cases deposited onto the pallet.

The present apparatus is shown in relation to the palletizing of filled cases having soft drink containers or bottles therein, but the apparatus obviously is suitable for use with any type of a filled case or package for depositing a plurality of the filled cases onto a pallet as a plurality of layers thereon for later transport, storage or movement of the pallets with one or more layers of cases positioned thereon.

Generally speaking, the present invention has as its main object the provision of a novel and improved palletizer machine characterized by the novel and improved processing of filled cases by the machine and by the provision of a pair of transfer plates in the machine, which transfer plates are moved through a fixed orbital cycle including movement in both horizontal and vertical directions.

Other objects of the invention are to provide a novel and improved palletizer which is adapted to store a plurality of unloaded pallets therein; which will pick up one pallet when needed and transport it in the machine to a load position for receipt of layers of filled cases thereon; to lower the pallet by index movement suitable vertical distances for each deposit of a layer of filled cases thereon for receipt of such layer by a gentle drop of the cases onto the pallet or cases contained thereon; to force cases by positive means from storage means on which an arranged layer of cases is positioned over onto a transfer plate in the apparatus and to provide means for moving the layer of cases on the transfer means off it onto a pallet positioned in the apparatus for deposit of layers of cases thereon; to provide novel clamp means in association with transport means in the apparatus for moving a pallet from a vertically positioned stack of pallets in the machine to a pallet loading station provided in the apparatus for positioning in the apparatus for case layer receiving action; to provide a novel and improved stack pallet positioning means in the apparatus for timed movement in association with other layer forming and palletizing actions in the apparatus; to provide means in the machine or apparatus for maintaining a transfer means or transfer plate in the apparatus level as it is being moved vertically through portions of its orbital path and to maintain the transfer plate horizontal as moved through horizontal portions of its fixed orbital movement; to provide a case input conveyor and associated control means for grouping a plurality of filled cases for movement laterally of the input conveyor for movement into the palletizing machine of the invention when a proper group of cases has been arranged on the conveyor; to provide a plurality of lines or groups of filled cases positioned in the apparatus for transfer to a pallet to form a layer thereon; and, to provide any desired conventional control means for the apparatus whereby the apparatus will function effectively for automatically loading a plurality of layers of cases onto a pallet and for providing an empty pallet when needed in the apparatus and for deposit of layers of filled cases thereon.

The present invention, generally speaking, relates to the provision in a palletizing machine of a combination including means for receiving a plurality of filled cases thereon positioned to form a layer for a pallet, a transfer plate or means positioned for fixed orbital movement in horizontal and vertical directions under and downstream beyond the said first-named means while such transfer plate is retained level, transfer means carried by the transfer plate to engage the cases and move them as a layer onto the transfer plate with orbital movement thereof, the machine being adapted to position a pallet under the transfer plate at one portion of its movement after the layer of cases is placed thereon, and a stop means is provided adjacent the path of movement of the transfer plate after it has the layer of cases thereon to engage the cases and force them off the transfer plate to drop onto a positioned pallet or cases thereon upon continued orbital movement of the transfer plate whereby an automatic, efficient loading action of filled cases in layer form onto a pallet in the machine is provided.

Attention now is particularly directed to the accompanying drawings, wherein.

General machine

Figure 1:
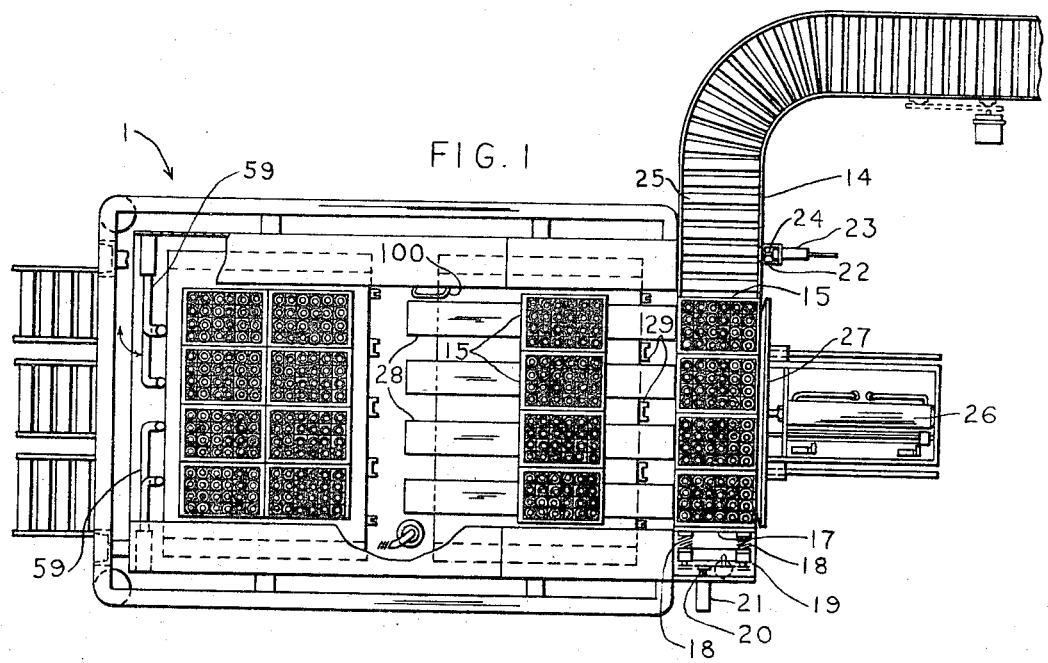
FIG. 1 is a partly diagrammatic top plan of the apparatus of the invention showing it in operation upon cases containing soft drink containers.

With reference to the details shown in the drawings, a palletizer apparatus or machine is indicated as a whole by the numeral 1. This palletizer 1 includes a suitable frame 2 that is of a substantially open construction and which provides a relatively tall, open frame means for support of the various components of the palletizer. Pallet supporting means, such as a pair of endless pallet supply chains or conveyors 3 and 4 are suitably journalled on the frame 2 at longitudinally spaced portions thereof and are positioned in parallel relationship on vertical axes. The chains 3 and 4 are spaced a proper distance whereby a plurality of pallets 5 can be supported upon a pair of cross bars 6 and 7 secured to the chains 3 and 4, respectively, and extending transversely thereof so that a stack of these pallets can be operatively positioned in the palletizer 1. Only one chain 3 and one chain 4 of a pair of endless spaced parallel chains are shown, for clarity, in the drawings.

The palletizer 1 also includes, as a primary novel component thereof, a pair of transfer plates 8 and 9 that are suitably positioned on the frame 2 by means such as endless chains, or conveyors 10 and 10a or the like, whereby such transfer plates are moved through a fixed orbital circuit including a pair of horizontal but vertically spaced courses A, B for action in transferring cases being processed by the apparatus of the invention. Also suitably journalled upon the frame 2 are pairs of endless discharge chains or conveyors 11 and 12. These chains 11 and 12 are positioned on vertical axes in spaced parallel relationship to each other and each of these chains has at least one transversely extending support bar or rod 13 extending between the pair of chains 11 and the pair of chains 12 whereby a pallet 5 can be engaged by the support bars to extend therebetween and be lowered by index movement of such chains whereby a pallet can be vertically movably positioned in the apparatus for receipt of layers of cases thereon for transport, storage or other action. Only one of each of the pair of chains 11 and 12 is shown in the drawings.

Case input

Figure 2:
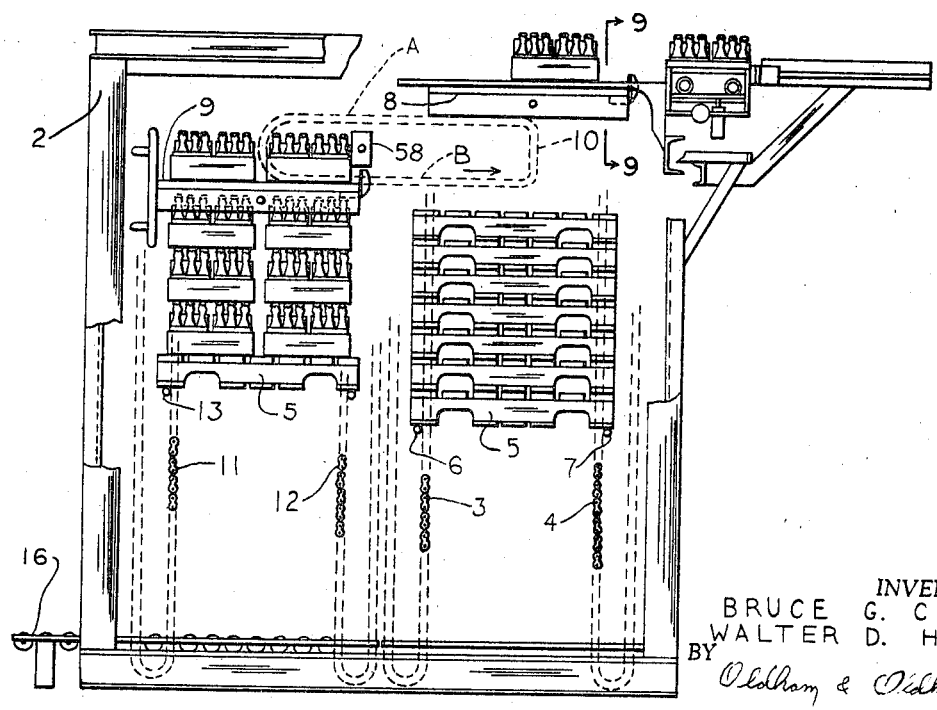
FIG. 2 is a fragmentary side elevation of the apparatus of FIG. 1 with portions of the apparatus being broken away and other portions of the apparatus being shown diagrammatically.

FIGS. 1 and 2 of the drawings best show that a suitable input conveyor 14 is provided adjacent the upper end of the frame 2 of the apparatus of the invention and that a plurality of filled cases 15 are carried by the conveyor 14, which is of any conventional construction, so as to be moved to a discharge end thereof, for example, in positions with the longitudinal axes of the cases 15 extending transversely of the input conveyor 14. The cases 15 are aligned on the conveyor.

In the apparatus as specifically shown in the accompanying drawings, the palletizer is adapted to position eight of the filled cases 15 as a layer and then to position a plurality of layers of these cases 15 on a suitable pallet which is discharged from the apparatus, as by manually moving a loaded pallet 15 over a discharge conveyor 16, which is of conventional construction. The discharge conveyor 16 is positioned at the lower portion of the discharge side of the palletizer apparatus shown and filled pallets 5 are deposited thereon by the chains 11 and 12.

In controlling the input of the cases 15 into the palletizer 1 for the type of a pallet layer shown, normally four individual microswitches (not shown) are positioned adjacent the lateral margin of the input conveyor 14 remote from the frame 2 whereby such microswitches are individually contacted and closed by the four cases 15, as shown in the drawings as they move down to a stop position adjacent the end of the input conveyor 14. These cases being fed into the apparatus have the first of such cases 15 strike a stop bar 17 that extends transversely of the conveyor, which stop bar 17 may be positioned by members, such as springs 18, that are carried by a control plate 19. The position of the control plate is regulated by means of a plunger 20 secured to the control plate and extending to a control means, such as a cylinder 21, whereby the plunger 20 can be moved axially a short distance so as to retract or move the control plate 19 downstream a short distance to permit additional downstream movement of the four cases 15 then bearing against the control plate 19 or against each other, as hereinafter described.

A fifth microswitch, or control switch 22, or equivalent member, is positioned adjacent the input conveyor 14 to be tripped by all cases moving along the conveyor but only to actuate its associated circiut by the fifth of the cases 15 moving downstream on the conveyor for palletizing action. When such control switch 22 is tripped by the fifth case, then an associated cylinder 23 or the like is actuated which forces a control plunger 24 or the like laterally of the conveyor 14 to press the fifth of the cases 15 laterally against a guide 25 or similar member to terminate, temporarily, downstream movement of such case until the four preceding cases in the apparatus have been properly processed. The fifth switch 22 also is so connected in the apparatus as to actuate the control cylinder 21 when the preceding four switches are closed and permit the four assembled cases 15 to move downstream a short distance to clear them from the fifth case on the input conveyor. Such actuation of the control switch 22 also is adapted to energize a further control cylinder 26 that is positioned on the side of the input conveyor 14 opposite to that of the frame 2. This cylinder 26 is of conventional construction and is adapted, when energized, to move a pusher bar 27 transversely of the input conveyor 14 for moving the four cases 15 over onto the frame 2 of the palletizer for further processing therein, as hereinafter described.

Transfer plate and associated means

The frame 2 of the apparatus suitably positions a plurality of support forks 28 in the apparatus immediately adjacent the input conveyor 14 and on the opposite side thereof as the control cylinder 26 and pusher bar 27. These support forks are horizontally positioned and are in spaced relationship to each other but are parallel and are level with the upper surface of the input conveyor 14 whereby the cases 15 being processed will readily slide from the conveyor onto the support forks.

The transfer plates 8 and 9, in the orbital movement given to them, are adapted to be moved directly under and adjacent the support forks 28 and each of the transfer plates has a plurality of transfer means such as upwardly extending lugs or fingers 29 provided thereon and adapted to extend between the adjacent portions of the support forks 28 and engage side or end portions of the cases 15 carried by the support forks. Hence, movement of the transfer plate 8, as shown in FIG. 2, along its upper horizontal course, causes the fingers 29 to force or push the arranged cases from the support forks 28 down to deposit onto the upper surface of the transfer plate 8.

Figure 8:
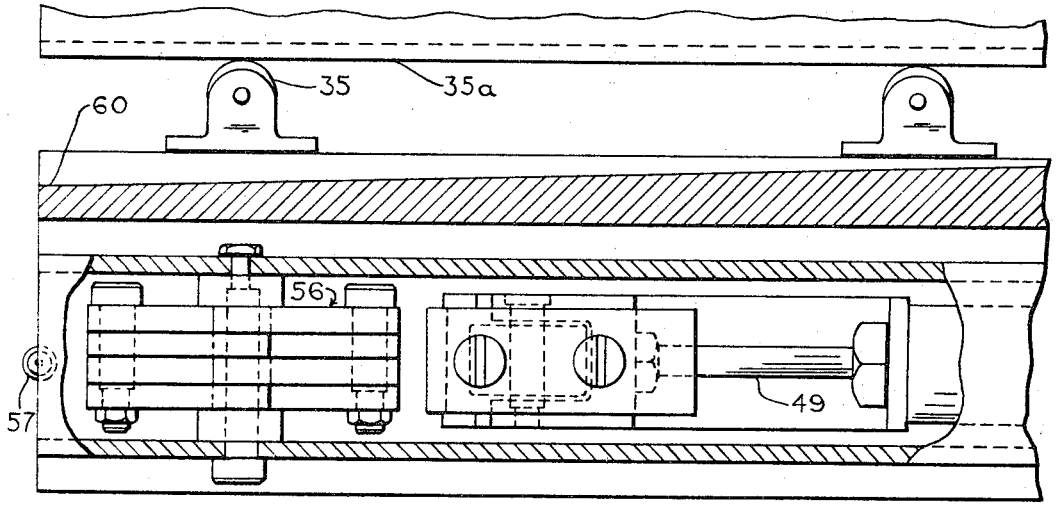
FIG. 8 is a fragmentary vertical section of an edge portion of the transfer plate and the associated positioning and clamp means associated therewith.
Figure 9:
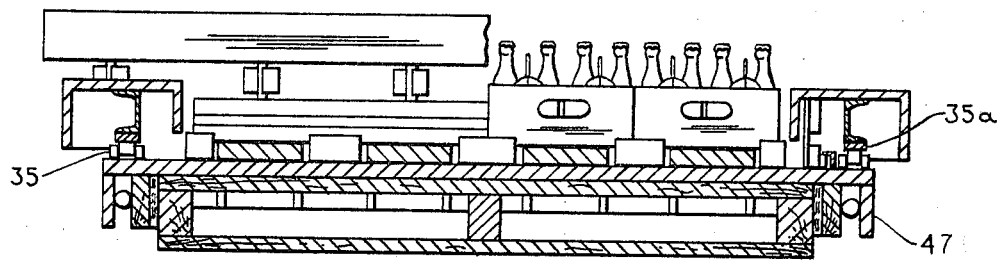
FIG. 9 is a fragmentary vertical section through the apparatus of the invention taken on line 9—9 of FIG. 2.
Figure 10:
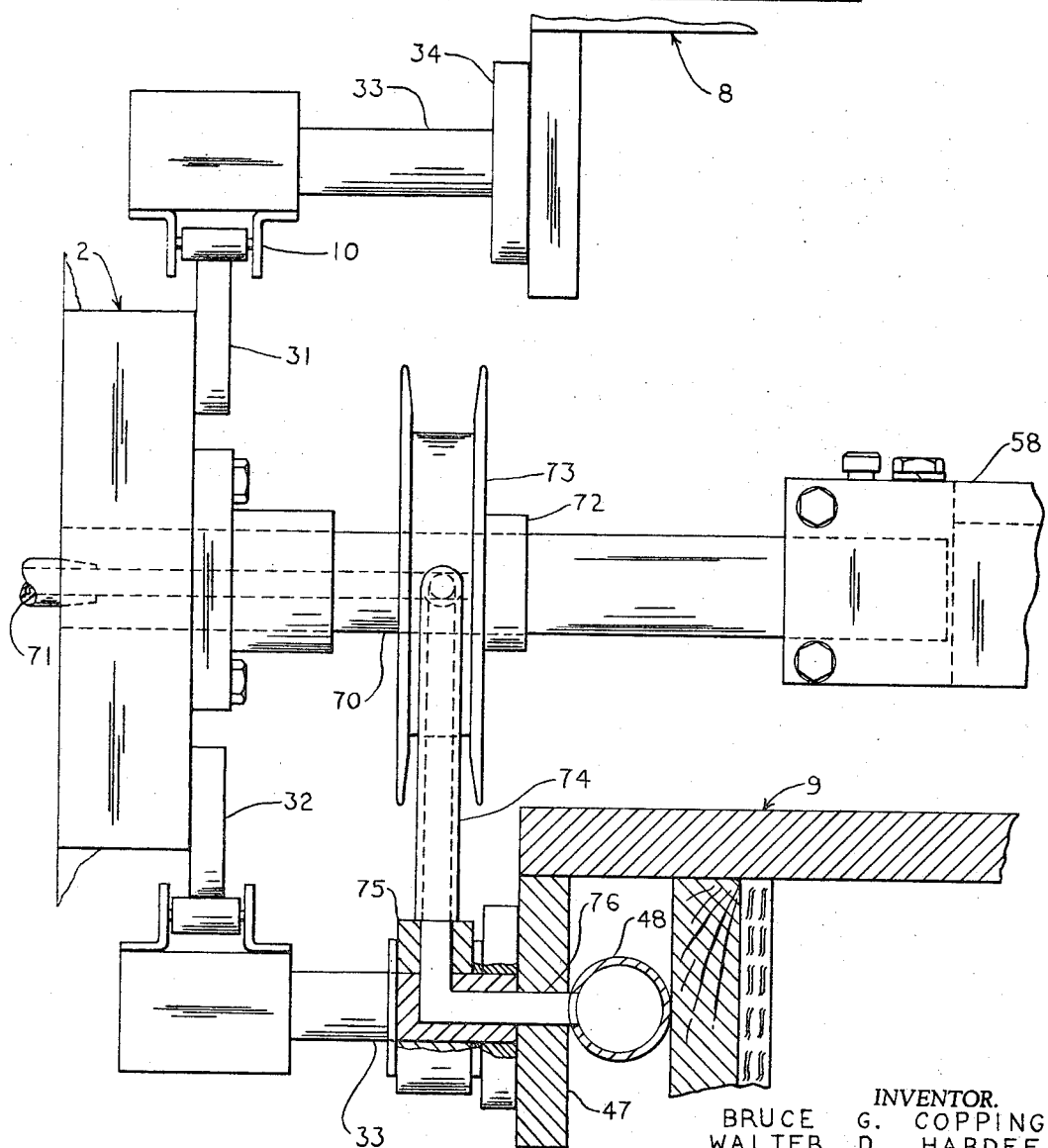
FIG. 10 is a fragmentary enlarged cross section of a side portion of a transfer plate and the associated control and power supply means.

FIGS. 9 and 10 of the drawings best show that as the chain conveyors 10 and 10a are moved through horizontal courses or paths in the frame 2 of the palletizer, such conveyors may move over suitable chain track guides or bars 31 and 32 and engage the upper surface of the upper guide 31 and the lower surface of the lower guide 32 to be maintained in fixed relationship to each other and the frame. Obviously the conveyors 10 and 10a may be of any desired construction and normally each conveyor is engaged with each of the transfer plates 8 and 9 by suitable means, such as a support rod or trunnion 33 secured to one of the conveyors and extending laterally inwardly therefrom, for journalling or engaging suitable means, such as brackets, or sleeves 34, thereon which brackets 34 are in turn suitably secured to opposed laterally outer margins of each of the transfer plates 8 and 9 whereby each transfer means or plate is engaged with its associated conveyors at a pair of laterally opposed portions thereof for pivotal movement with relation to these support conveyors. The guides 31 and 32 are suitably secured to the frame 2. Any other desired means may be provided in association with the transfer plates, FIG. 8, such as a plurality of rollers or guides 35 that are journalled on the transfer plates at the lateral margins thereof and having bearing engagement with a guide 35a on the frame as the transfer plates are moved along horizontal courses with relation to the frame 2.

Figure 4:
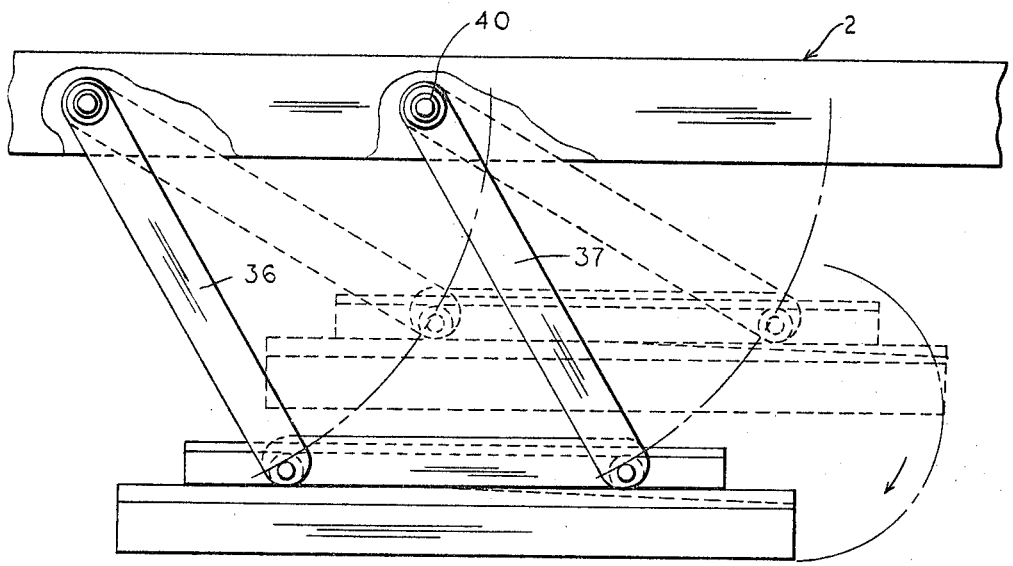
FIG. 4 is an enlarged side elevation of one pair of the stabilizer means of FIG. 3 showing them in different operative positions with vertical movement of a transfer plate.
Figure 3:
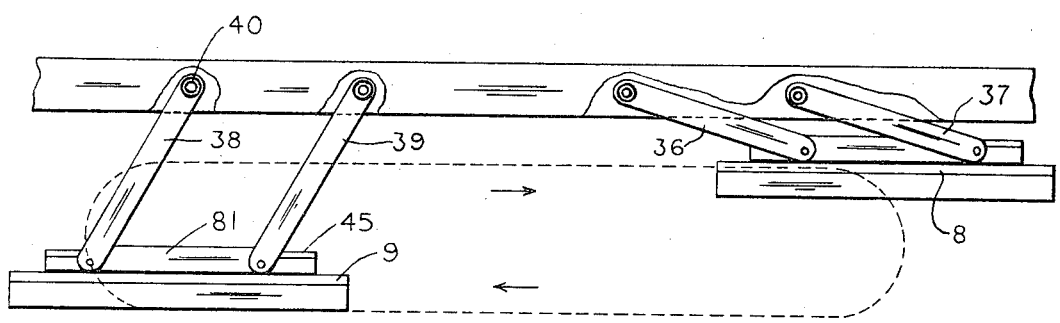
FIG. 3 is a fragmentary enlarged side elevation, partially diagrammatic, showing the transfer plate members of the machine and the orbital path thereof and the associated level controlling, or stabilizer means.
Figure 5:
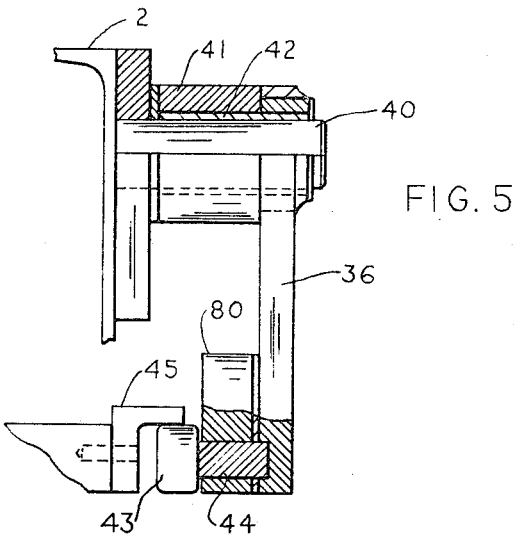
FIG. 5 is an enlarged end elevation, partially broken away and shown in vertical section, of a portion of the stabilizer means of FIGS. 3 and 4.

A further feature in the positioning and action of the transfer plates 8 and 9 includes the stabilizer means shown in more detail in FIGS. 3, 4 and 5 of the drawings. In this instance, as shown in FIG. 3, two pairs of stabilizer arms or links 36, 37 and 38, 39 are shown pivotally secured, as by pins or bolts 40, at the upper ends of the stabilizer arms to a portion of the frame 2 so as to be suspended therefrom. These stabilizer arms 36 and 37 are at the downstream end of the upper horizontal course of the transfer plates, while the other stabilizer arms are at the downstream end of the lower horizontal course. FIG. 5 shows that the support pins 40 may have suitable spacers 41 associated therewith to space the stabilizer arms from the frame 2 and any suitable means such as a support sleeve or bearing 42 rotatably supports the stabilizer arm 36 for pivotal movement thereon as hereinafter described in more detail. At the lower ends of each of the stabilizer arms, a roller or equivalent member 43 is supported and it is journalled on a support shaft 44 by conventional means. The lower ends of the arms 36 and 37 are secured together by a bar 80, while a bar 81 is attached to the arms 38 and 39 for unitary movement thereof. The support shaft 44 is in turn suitably secured to the lower end of its stabilizer arms. These rollers 43 in association with the stabilizer arms on which they are positioned are adapted to be brought into engagement, automatically, with the upper surface of the transfer plates as they are moved through their orbital paths, and with the positioning of the stabilizer arms and rollers 43 being such that the arms are controlled in their positions so that the rollers 43 move in under an overhanging guide or shoe 45 that extends a major portion of the length of each of the transfer plates along each lateral margin thereof for engaging with the stabilizer arms and the roller means thereon as the transfer plates move through the vertical portions of their orbital movement. Specifically, the stabilizer arms 36 through 39 are all of equal lengths, and they are adapted to be engaged, by pairs, with the shoes 45 or equivalent means on an individual transfer plate as it is being moved through the last portion of its upper or lower horizontal course and to remain in engagement with the shoe 45 as the transfer plate is moved through the vertical arc or portion of its orbit. Hence, the two longitudinally spaced rollers 43 on, for example, the stabilizer arms 38 and 39, engage with longitudinally spaced portions of the shoe 45 to maintain the transfer plate horizontal as it is being moved through its vertical path. These stabilizer arms 38 and 39 will then be automatically disengaged from the shoe 45 with continued horizontal movement of the associated transfer plate. These arms will just remain suspended until the next transfer plate is moved through a horizontal course to engage or bear on the lower end of the leading stabilizer arm and cause the arms to move in under the shoe 45 on the next transfer plate to swing through an orbit therewith. Hence, the stabilizer means will function automatically and continuously to stabilize and maintain the transfer plates level while they are being moved through the vertical portions of their orbits, which portions connect to two horizontal courses in the orbit of the individual transfer plates. Such vertical axes may be the same or different at the two ends of the orbit path and the conveyor's arcuate movement may be controlled in any suitable manner. Sets of the stabilizer arms may be provided at one or both lateral margins of the transfer plates.

Figure 6:
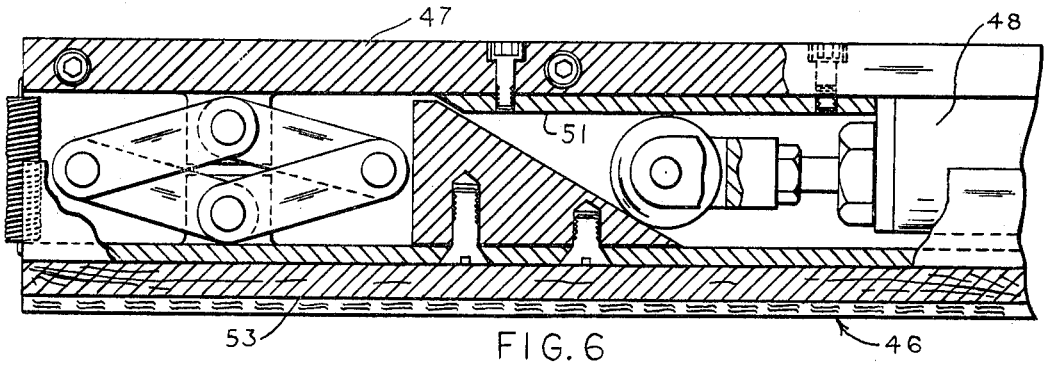
FIG. 6 is a fragmentary horizontal section taken through the clamp means associated with each side of the transfer plates of the apparatus showing the clamp means in retracted form.
Figure 7:
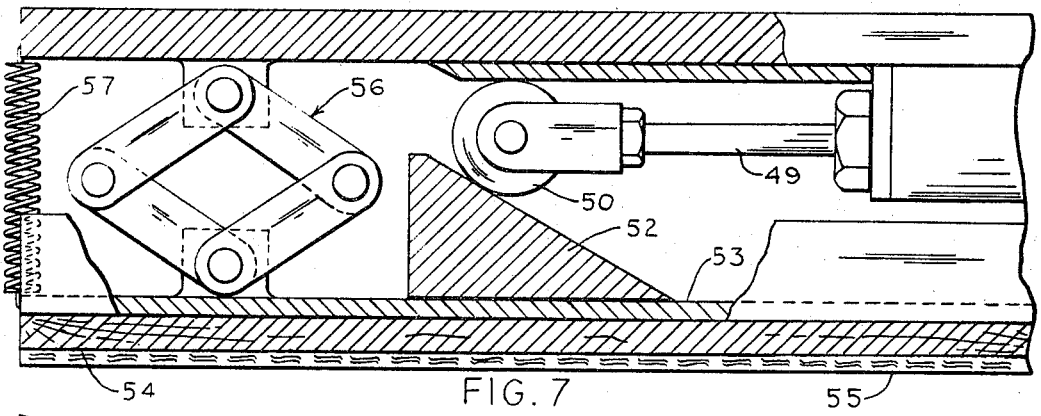
FIG. 7 is a section, similar to FIG. 6, of the clamp members in extended or operative position.

Yet other important novel members provided in association with each of the transfer plates 8 and 9 comprise a pair of clamp means 46, FIGS. 6, 7 and 8, that are suitably secured to the lower surface of each transfer plate on opposed lateral margins thereof and dependent therefrom. Specifically, a support plate 47 is suitably secured to opposed lateral margins of each of the transfer plates 8 and 9 and is dependent therefrom, and it has a suitable power actuated means, such as a cylinder 48, secured to the laterally inner surface of such support plate. The cylinder 48 preferably has a power actuated plunger 49 extending from each end thereof with a cam roller 50 journalled on the end of each such plunger or piston rod 49. The drawings clearly show that this roller bears upon a suitable member, such as a guide plate 51, attached to the inner surface of the support plate 47, and the roller also will engage a wedge, or cam member 52. The wedge or cam member 52 is in turn supported on a member, such as a pressure plate or bar 53 extending longitudinally of the transfer plate that has any desired facing means such as a wooden board 54 and a resilient face plate 55 secured to the board 54 to provide the actual member which will engage with a side portion of a pallet 5. Hence, simultaneous actuation of a pair of the clamp means 46 provided on an individual transfer plate will cause laterally inward movement of the pressure bars 53 and associated means to engage a pallet and carry it along with the transfer plate for movement thereunder. The orbital movement of the transfer plates brings them into register with the top pallet on the conveyors 3 and 4. Obviously, if desired, a pair of the cylinders 48 and associated means can be provided in association with each of the clamp means 46 to actuate them at spaced portions thereof for effective pressure engagement with the pallet to lift and carry it along with the tranfer plate.

The pressure bars 53 and associated means are also connected to the support plate 47, as by toggle means 56, secured thereto and extending therebetween and by a resilient member, such as a coil spring 57. Obviously the toggle means 56 and coil springs 57 are so selected that they will permit the laterally inward movement of the pressure bar 53 and members secured thereto to engage a pallet and then will draw such means back to the inoperative positions, as shown in FIG. 6, when the power for the cylinders 48 is reversed or the cylinders are no longer actuated.

It will be realized that one of the pallets 5 thus can be engaged between a pair of the clamp means 46 on a transfer plate and be picked up from the input conveyors 3 and 4 and moved upwardly and then horizontally and ultimately vertically downwardly by the orbital path of the conveyors 10 and 10a whereby when the pallet 5 is positioned over and in register with the discharge conveyors 11 and 12, the clamp means then can be actuated to release the pallet 5 for engagement on the bars 13 and be lowered by index movement through the control means provided for the palletizer of the invention.

As another feature of the invention, a stop, or case discharge member 58 is provided in the apparatus and is indicated in FIG. 2 of the drawings. Such stop or bar 58 extends transversely of and is carried by the frame 2 of the apparatus and it is positioned above the lower horizontal course for the transfer plates. The stop is also positioned above the fingers 29 extending upwardly of each of the transfer plates. The stop 58 is so positioned that it will engage the cases 15 as the individual transfer plates are started to be moved downstream on their lower horizontal course. By this engagement action, the cases 15 are pushed from the transfer plate on which they are carried and they will then drop smoothly from a downwardly beveled edge 60 of the transfer plate onto either a positioned pallet immediately below the transfer plate at that time, or else upon a previous layer of the cases 15 deposited upon a pallet positioned on the discharge conveyors 11 and 12.

Usually it is desirable to have a pair of some type of guide means 59 that are resiliently positioned along the discharge conveyor 11 and these guides are pivotally positioned in the apparatus on vertical axes to normally be urged inwardly of the apparatus and abut on any cases 15 that might tend to move laterally off of a vertically aligned position with the pallet and/or case means immediately therebelow. Any suitable members are associated with the guide 59 to permit them to move outwardly if excessive forces are applied thereon but otherwise they maintain an aligning action on the cases as they are stacked upon and lowered by the discharge conveyors 11 and 12. These guides 59 normally extend the height of the discharge conveyor 11 and are immediately thereadjacent. One guide is positioned adjacent each lateral margin of the frame 2 of the apparatus and the guides thus extend inwardly of the apparatus about half the width thereof to provide the aligning and safety actions described hereinabove.

It will be realized that some power supply means must be provided for supply of power to the cylinder 48 in the clamp means 46. Usually this cylinder 48 is a double end actuating cylinder wherein one operative plunger arm 49 extends from each end of the cylinder 48 to provide a pressure support action for the pusher bar 53 adjacent each end thereof. By this positioning, plus the use of a pair of toggle means 56, if the pallet is slightly out of a true square condition, the pressure bar 53 can adjust to such pallet for good clamping engagement therewith.

FIG. 10 of the drawings shows additional support means for the transfer plates 7 and 8 as well as associated power supply means used in association therewith. Thus, a portion of the frame 2 is shown which has a tubular support rod or shaft 70 suitably secured thereto and supplied with a suitable pressure medium, such as a supply of compressed air, through a tube or conduit 71 that connects to the shaft 70. The shaft 70 also has a suitable rotary or slip coupling 72 thereon for supply of compressed air from the bore of the shaft 70 through the coupling 72 to a suitable retractable cable reel or drum 73 that is adapted to have lengths of a flexible power supply tube or cable 74 secured thereto and extending therefrom. Such power supply cable or tube 74 in turn connects to a conventional rotary joint or coupling 75 that in turn is suitably secured to and carried by the trunnion 33 on which the transfer plate 9 is shown positioned. Thus, compressed air or other power medium is fed through the rotary joint or equivalent member 75 through the interior of the trunnion by a bore 76 therein for suitable connection by conventional means from the inner end of the bore of this trunnion to the clamp or control cylinder 48 carried by this particular transfer plate. As the center portion of the palletizer 1 is open, this retractable power supply tube 74 will just move around in the apparatus with orbital movement of the transfer plate to which it is attached and be automatically coiled or recoiled upon the drum 73 as the transfer plate moves towards the shaft 70 on which the drum 73 is operatively positioned.

It will be realized that any other desired power supply means can be used for controlling actuation of these cylinders 48, but that one conventional supply of power thereto has been illustrated herein.

Power for the other transfer plate preferably is supplied from the other side of the apparatus by means similar to that shown in FIG. 10.

The stop bar 58 is secured at its ends to the frame 10 by suitably engaging the support rods or shafts 70 adjacent the lateral margins of the apparatus.

One of the automatic control members provided in the apparatus includes a suitable switch 100 which is secured to the frame adjacent the ends of the support fingers or forks 22. Thus, as the cylinder 26 and associated pusher bar 27 move one row of cases over onto the support forks, such cases remaining in position adjacent the infeed conveyor until the second group of four aligned cases are next pushed from the input conveyor over onto the support forks which second action also pushes the first row of cases an additional distance axially inwardly of the machine so that such cases strike the control switch 100 and actuate it to produce drive of the control conveyors 10 and 10a for the transfer plates to maintain them, or start them, into orbital movement for receipt of cases thereon. Hence, if desired, the actuation of the control conveyors 10 and 10a is such as to move them through 180° of their orbit so as to receive a layer of cases on a transfer plate and position them preparatory for deposit onto an associated pallet 5 and then normally the machine would require a second actuation of the microswitch 100 to continue the transfer plate through its orbit and deposit an additional layer of cases on the other transfer plate, while the cases upon the first pltae are being wiped or pushed therefrom for deposit onto the storage pallet.

It will be realized that any desired control means can be provided in association with the apparatus of the invention, but normally such controls are electrically powered and actuated by substantially conventional means so that the intervals and extents of drive of the input conveyors, discharge conveyors, and transfer plate control conveyors can all be regulated and the apparatus of the invention will function automatically as long as sufficient pallets 5 are contained in the appartus and/or as long as sufficient numbers of the cases 15 are being fed into the apparatus for functioning thereof. The controls also provide for pick-up of a pallet 5 at desired intervals in the orbital movement of the transfer plates.

While the apparatus shown has one type of layer forming means and controls provided for use therewith, it should be noted that other means may be provided for control of movement and the positions of cases as supplied to the support forks 28, or equivalent means, for pick-up and transfer in the palletizer of the invention.

Other known controls may be used to operate the cylinder 26, the cylinder 23, and the cylinder 21. Thus, for example, a photoelectric cell and light beam source may be used at the input station. Four flag means may be positioned to interrupt such light beam with one flag being moved out of the light beam with each case as it reaches the end of the input conveyor. Hence, when all four flags are moved, then the control for the cylinder would be energized to actuate the control or stop plunger 24 to prevent further case feed. The control plate 19 would then be moved downstream an inch or two for clearance and the cases would be clear for movement over onto the support forks 28 by the cylinder 26 and associated means.

The palletizer is of sturdy construction and will provide a long service life to load, automatically, cases onto pallets for further processing, storage or transport. Thus, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:
1. In a palletizing machine, the combination including means for receiving a plurality of filled cases positioned to form a layer for a pallet,
a transfer plate positioned for a fixed orbital movement in horizontal and vertical directions under and be- yond said means while such transfer plate is retained level, transfer means carried by said transfer plate to engage said cases and move them as a layer onto said transfer plate with orbital movement thereof, means for positioning a pallet under said transfer plate at one position of its movement after said cases are thereon, and a stop means adjacent the path of said transfer plate in a lower course of movement and after it has said cases thereon to engage said cases and force them off said transfer plate to drop onto a positioned pallet or cases thereon upon continued orbital movement of said transfer plate.

2. A palletizing machine as in claim 1 where clamp means are carried by said transfer plate on a pair of opposed margins thereof below said transfer plate, said clamp means being engageable with a pallet to move it with said transfer plate for a portion of its orbit and to deposit such pallet in the machine for receipt of cases forced from said transfer plate by said stop means.

3. A palletizing machine as in claim 2 where each of said clamp means includes
a frame secured to a transfer plate and dependent therefrom,
a clam bar parallel to said frame and resiliently movably secured to said frame for movement laterally inwardly of said transfer plate,
a cam means carried by said clamp bar, and
power operated means for engaging said cam means and moving said clamp bar inwardly of said transfer plate while said clamp bar is retained parallel to said frame to engage a pallet and move it with and below said transfer plate.

4. A palletizing machine as in claim 1 where
a vertically positioned conveyor means is provided for receiving a plurality of stacked pallets thereon and moving the top one of such pallets up to a position immediately below one portion of the orbit of said transfer plate.

5. In a palletizing machine as in claim 1 where
said transfer plate is positioned for orbital movement by means pivotally engaging a pair of laterally opposed center portions of said transfer plate, and means are present adjacent each end of the orbital path of said transfer plate to engage it and retain such transfer plate level as it is moved vertically.

6. A palletizing machine as in claim 1 where
a conveyor is positioned adjacent an infeed end provided on said first-named means to receive and align a plurality of cases thereon, and
pusher means are positioned adjacent said conveyor on the opposite side thereof as said first-named means and being actuable to slide the cases from said conveyor in a direction at right angles thereto over onto said first-named means.

7. A palletizing machine as in claim 1 where
said transfer plate is positioned for orbital movement by means engaging a pair of laterally opposed center portions of said transfer plate, and means are present adjacent each end of the orbital path of said transfer plate to engage it and retain such transfer plate level as it is moved vertically, said means comprising
an overhanging flange member secured to said transfer plate,
a pair of pivotally supported downwardly extending parallel link arms positioned adjacent each end of said orbit of said transfer plate, and
roller means carried by each of said link arms at the lower ends thereof to engage under said flange member and retain said transfer plate level as it is moved vertically.

8. A palletizing machine as in claim 1 where
a machine frame is present, and
guide means engage between said frame and said transfer plate to retain said transfer plate horizontal as it is moved through said upper and lower courses.

9. A palletizing machine as in claim 1 where
a pair of parallel clamp means are carried by said transfer plate on a pair of opposed margins thereof below said transfer plate, said clamp means being movable inwardly while retained parallel to a pallet to move it with said transfer plate for a portion of its orbit and to deposit such pallet in the machine for receipt of cases forced from said transfer plate by said stop means,
said machine including a frame,
means pivotally engaging a pair of laterally opposed center portions of said transfer plate, and means on said frame are present adjacent each end of the orbital path of said transfer plate to engage it automatically and retain such transfer plate to position it for orbital movement level as it is moved through the vertical portion of its orbit.

10. In a palletizing machine, the combination including
means for receiving a plurality of cases positioned to form a layer for a pallet,
means for collecting cases at one position as they are fed thereto by movement in one direction,
means for moving the collected cases at said one position in a direction normal to said one direction for deposit onto said case receiving means,
a transfer plate positioned for a fixed orbital movement in upper and lower courses connected by vertical courses under and downstream of said means while such transfer plate is retained level,
transfer means carried by said transfer plate to engage said cases and move them as a layer onto said transfer plate with downstream orbital movement of said transfer plate on its upper course,
means for positioning a pallet under said transfer plate at the upstream end of its lower course of movement, and
a stop means adjacent the path of said transfer plate in its lower course of movement to engage said cases and force them off said transfer plate to drop onto a positioned pallet or cases thereon upon continued orbital movement of said transfer plate.

11. A palletizing machine as in claim 10 where a pair of transfer plates are present,
a pair of spaced parallel conveyor means are provided to position and move said transfer plates, and
trunnion means secure opposed portions of the transfer plates to said conveyor means to extend therebetween.

References Cited
UNITED STATES PATENTS

| | | | |
|---|---|---|---|
| 2,397,720 | 4/1946 | Beane | 214—6 |
| 2,686,603 | 8/1954 | Lawson | 214—6 |
| 2,730,247 | 1/1956 | Lawson | 214—6 |
| 2,738,116 | 3/1956 | Barraclough | 214—6 |
| 2,768,756 | 10/1956 | Horman | 214—6 |
| 2,924,342 | 2/1960 | St. Jean et al. | 214—6 |
| 3,050,199 | 8/1962 | McGrath et al. | 214—6 |
| 3,169,646 | 2/1965 | Mason | 214—6 |

ROBERT G. SHERIDAN, *Primary Examiner.*

F. E. WERNER, *Assistant Examiner.*